United States Patent [19]

Skala

[11] 4,246,955
[45] Jan. 27, 1981

[54] PRESSURE COOKING APPLIANCE WITH THERMAL EXCHANGE FLUID

[76] Inventor: Stephen F. Skala, 3839 S. Wenonah Ave., Berwyn, Ill. 60402

[21] Appl. No.: 941,123

[22] Filed: Sep. 11, 1978

Related U.S. Application Data

[63] Continuation-in-part of Ser. No. 299,214, Oct. 4, 1972, Pat. No. 3,888,303, and Ser. No. 569,354, Apr. 18, 1975, abandoned, and Ser. No. 769,389, Feb. 16, 1977, abandoned.

[51] Int. Cl.³ .............................................. F25B 29/00
[52] U.S. Cl. .................................. 165/26; 165/48 R; 165/61; 165/104 S; 165/18; 99/330
[58] Field of Search ....................... 165/48, 104 S, 105, 165/14, 26, 58, 61, 32, 15, 122; 99/467, 470, 472, 473, 474, 483, 330; 426/509, 510, 511, 520, 523

[56] References Cited

U.S. PATENT DOCUMENTS 3,818,818  6/1974  Hice ........................................ 99/330

Primary Examiner—Albert W. Davis
Assistant Examiner—Margaret A. Focarino

[57] ABSTRACT

A domestic pressure cooking appliance includes a heat exchanger connected to means for regulating flow of a liquid phase thermal exchange fluid which is heated and cooled by thermal sources separate from the pressure cooker. For cleaning and handling convenience, food is first placed in a removable food container. In order to enhance exchange of heat with the food or its container, one embodiment of the pressure cooker uses forced air convection and another embodiment uses latent heat of water vaporization from a wick covering the food container.

The pressure cooking appliances in their several embodiments are part of a system of domestic appliances wherein a plurality of various appliances connect to mains containing the thermal exchange fluid which is forced to circulate under control of selector and regulator valves between the appliances and thermal reservoirs at hot, cold, and moderate temperatures.

7 Claims, 4 Drawing Figures

PRESSURE COOKING APPLIANCE WITH THERMAL EXCHANGE FLUID

CROSS-REFERENCES TO RELATED APPLICATIONS

This application is a continuation-in-part of Ser. No. 299,214 filed Oct. 4, 1972 and now U.S. Pat. No. 3,888,303; and Ser. No. 569,354 filed Apr. 18, 1975 and now abandoned; and Ser. No. 769,389 filed Feb. 16, 1977 and now abandoned.

Ser. No. 756,392 entitled Method for Reducing Thermal Degradation of a Heat Exchange Fluid, now U.S. Pat. No. 4,164,253.

Hot Reservoir System for Intermittent Users.

Ser. No. 792,455 entitled Oven with Refrigerated Food Storage based on Thermal Exchange Fluid.

Ser. No. 839,618 entitled Domestic Appliance System with Thermal Exchange Fluid.

Ser. No. 908,509 entitled Freezer with Rapid Defrosting.

BACKGROUND

This invention relates to pressure cookers and particularly to pressure cooking appliances which are heated and cooled by a thermal exchange fluid.

This invention, the cross-referenced applications, and U.S. Pat. Nos. 3,888,303 and 4,024,904 relate to aspects of a system of appliances wherein heat is exchanged between a plurality of appliances and a plurality of thermal reservoirs by forced circulation of a thermal exchange fluid. The thermal reservoirs include a hot reservoir to heat the thermal exchange fluid for cooking functions and a cold reservoir to cool the thermal exchange fluid for refrigerating functions. Pumps maintain a differential pressure in supply and return main pairs associated with each thermal reservoir. Since most active functions of the appliance system are provided by assemblies commonly shared by the appliances, an appliance unit is less complex than a corresponding conventional appliance, yet it can provide more complex heating and cooling functions with advantages of thermal storage.

Foods having water as a constituent substance attain higher temperatures at higher pressure due to higher boiling temperatures. Heat transfer rates to the interior of a food mass are increased as are reaction rates which comprise a cooking process. Reaction rates approximately double for each 20° F. increase in temperature. Accordingly, cooking at a pressure of two atmospheres above normal pressure, which corresponds to a water boiling temperature of 273° F., increases reaction rates by about a factor of eight. Conventionally, saturated steam is the gas within an operating pressure cooker. Temperature is determined by water vapor pressure and is regulated by pressure responsive venting. Less conventionally, more complex pressure cooking processes are used to advantage. As an example, moisture loss of cooking food is retarded by adding pressure of compressed air to water vapor pressure and it is also retarded by rapid cooling after cooking. Food may also be fried at high temperatures and pressures to provide rapid cooking with browned and crisped food surfaces. Other processes using pressures above and below atmospheric, hot and cold temperatures, and controlled rates of pressure and temperature change also provide unique food properties which may be regarded as desirable. It is generally useful to provide means for expanding conditions under which food can be processed to permit selection of particular combinations of conditions which result in food properties regarded as having aesthetic value for individual tastes. Known apparatus for providing more complex pressure processing functions, however, is complex and would be too costly for domestic use.

OBJECTS

It is a general object of the invention to provide improved pressure cooking apparatus which is heated and cooled by a thermal exchange fluid to provide an expanded range of food processing conditions.

It is another object to provide domestic pressure cooking appliance units which share with other types of appliances an assembly of thermal reservoirs which provides large peak thermal capacity and other advantages.

It is yet another object to provide rapid transfer of heat to and from food in removable food containers within a pressure cooking appliance.

SUMMARY

These and other objects and advantages are attained in accordance with the invention wherein a pressure cooker is heated to temperatures sufficient to develop high pressure in the pressure cooker and is cooled to low temperatures by a thermal exchange fluid which is heated and cooled by sources separate from the pressure cooker, the thermal exchange fluid being characterized as remaining in a liquid phase at atmospheric pressure and at the temperatures of the sources of heat and cold. The thermal exchange fluid is forced to circulate in a fluid circuit which includes a heat exchanger in the pressure cooker and also includes the sources of heat and cold. Preferably, the sources of heat and cold are thermal reservoirs of large thermal capacity through which the thermal exchange fluid flows to exchange heat. Since known thermal exchange fluids can operate at temperatures ranging from about $-60°$ F. to 600° F., a system of the kind described can provide any reasonable cooking and refrigerating temperature.

In another of its aspects, the invention provides means for enhancing exchange of heat within the pressure cooker between the thermal exchange fluid in a pressure cooker heat exchanger and food in a removable food container to utilize effectively the thermal capabilities of the system of thermal reservoirs while retaining small houseware handling convenience of food in a large and usually permanently located pressure cooking domestic appliance. One novel means for enhancing heat exchange within a pressure chamber is cooling by vaporization of water to complement conventional heating by condensation of water vapor. Both of these effective cooling and heating processes are based on latent heat of phase transition between liquid water and its vapor. Apparatus for cooling by vaporization comprises a wick covering a portion of a pressure food container which wick absorbs water condensing on a cooled portion of a pressure vessel. During a heating phase, water on the heated bottom of the pressure vessel is vaporized to condense on the cooler pressure food container for rapid heating and the condensate flows back for revaporization. During a cooling phase, water is drawn into the wick by capillary action to be vaporized for rapid cooling after which it is condensed to continue the cooling process. Another novel means for enhancing exchange of heat within a pressure vessel is forced recirculation of gases. A heat exchanger in the pressure vessel has a radiator structure for effective heat exchange with gases and is located in a duct proximate to a fan which blows heated and cooled gases upon food. Advantages include rapid heating of food under pressure with browning and crisping of of food surfaces exposed to the heated moving gases, rapid cooling to a serving temperature, and reduction of moisture and flavor losses.

In yet another of its aspects, the invention provides apparatus to regulate partial pressure of water vapor by means of another heat exchanger in the pressure vessel which receives hot and cold thermal exchange fluid to evaporate water and to condense water vapor. This heat exchanger is located within a thermally insulated vapor control chamber having means to add and to drain water and having openings to allow some flow of gases to and from the pressure chamber. Such means of water vapor pressure control are of particular advantage when food is to be processed at high temperatures, for such effects as are associated with roasting or frying, at which temperatures water vapor pressure would otherwise exceed safe levels. Addition of water vapor is useful when cooking begins to rapidly increase pressure to levels of saturation when increased loss of food moisture for such purposes would be undesirable. A still more complete control of pressure and composition of gases within the pressure vessel may be provided by a compressed air source and is of particular utility for rapid cooling of food under pressure or for cooking at pressures above those of saturated water vapor for desirable effects on food properties. The combination of large thermal capacity of the hot and cold reservoirs, rapid heat exchange between the heat exchanger and the food by forced convection of gases, and control of water vapor pressure provides useful food processing conditions for domestic use with apparatus of only moderate complexity.

The apparatus of the invention comprises pressure cooking appliance units of the kind described having a pressure vessel, a heat exchanger to receive a thermal exchange fluid to heat and cool the pressure vessel, a regulator valve to modulate flow of the thermal exchange fluid to regulate temperature of the pressure vessel, and selector valves to control heating and cooling of the thermal exchange fluid separate from the pressure cooking appliance. The thermal sources and associated assemblies for delivering the thermal exchange fluid at selected temperatures to the appliances have significant effects upon the utility of the invention, are described in more detail in the cited copending applications, and are now described briefly.

In the preferred embodiment, the thermal sources are thermal reservoirs each having a reservoir heat exchanger through which the thermal exchange fluid can flow to be heated or cooled. Included among the thermal reservoirs are a hot reservoir maintained above hot oven cooking temperatures, approximately 575° F., by a heat storing material having a large heat of crystalization at the high temperature, a cold reservoir maintained below freezer temperatures, approximately −20° F., by a thermal storing material having a large heat of fusion at the low temperature, and an auxiliary heat sink at outdoor ambient temperature or at the moderate temperature of some other heat sink such as the input of a water heater. The thermal reservoirs are charged at moderate power levels during off-peak hours yet are able to provide large quantities of thermal energy during periods of peak appliance use. Improved energy utilizing features of a system of thermal reservoirs with distribution of thermal energy by circulation of a thermal exchange fluid thus include reduced demand on electric utilities during peak periods, large thermal power output with small electrical power input, and transfer of unwanted heat from kitchen appliance areas to reduce thermal loading of kitchen air conditioners and of the thermal reservoirs during temperature transitions between hot and cold.

Another group of advantages relate to economies and performance deriving from shared use by a plurality of appliances of the thermal reservoirs and means to deliver the thermal exchange fluid. One advantage is that cost of the common assemblies is only weakly dependent upon thermal capacity so that to a first approximation any number of appliance units can be connected at only the cost of the appliance units. But the cost of an appliance unit is less than the cost of a corresponding conventional appliance unit since conventional thermal sources and related controls are replaced by more economical heat exchangers and valves. Yet both heating and cooling capability of large thermal capacity is provided. Accordingly, pressure cooking appliances of the kind described can be provided in several sizes and configurations at reasonable cost to include as an added feature refrigerated storage of several courses of the next day's dinner for unattended cooking and completion at a predetermined time.

DESCRIPTION OF THE DRAWINGS

In FIG. 1, basic features of a pressure cooker having an enclosed chanber heat exchanger for receiving a liquid phase thermal exchange fluid delivered from sources of heat and cold according to the invention are shown with basic features of the preferred embodiment for heating and cooling the thermal exchange fluid.

Figure 1:
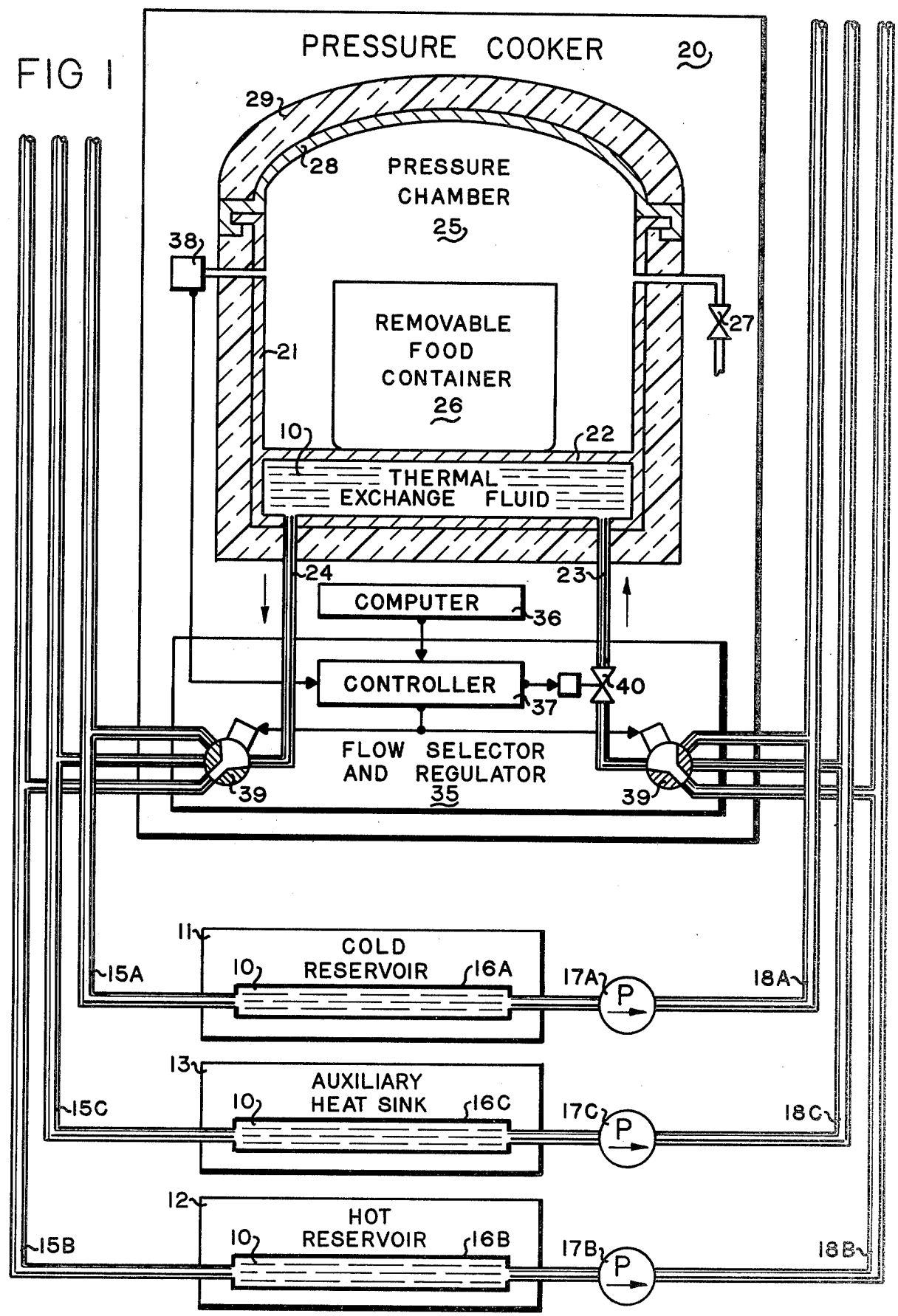
FIG. 1 is a diagrammatic drawing of the basic system of the invention showing a side sectional view of a pressure cooking appliance and showing schematically preferred means for heating and cooling a thermal exchange fluid for delivery to means for selecting and regulating its flow through a heat exchanger in the pressure cooking appliance.

A general characteristic of the system of domestic appliances disclosed in this and the cross-referenced copending applications is that heat is exchanged between thermal reservoirs and the appliances by forced circulation of the thermal exchange fluid. The thermal reservoirs and associated assemblies for transporting the thermal exchange fluid which are commonly shared by the appliances are designated by reference numerals 10 through 18.

Thermal exchange fluid 10 remains in a liquid phase in a temperature range between the thermal reservoirs which are typically at −20° F. and at 575° F. An example of a suitable thermal exchange fluid is the aromatic hydrocarbon "Therminol 60" manufactured by Monsanto Corporation and includes the following properties: an operating range of −60° F. to 600° F., a pour point of −80° F., a specific heat of approximately 0.5, and a vapor pressure at 600° F. of 760 mm Hg. It has an auto-ignition temperature of 835° F. and is classified as practically non-toxic based on vapor inhalation and oral and skin absorption studies.

Thermal energy is stored in hot and cold reservoirs as latent heat of phase transition. Structures of the thermal reservoirs are described in more detail in the cited U.S. Pat. Nos. 4,164,253 and 4,173,993 cold reservoir 11 comprises the following components, not shown: an insulated vessel containing a substance having a large latent heat of fusion at a predetermined low temperature which may be an aqueous solution of ethylene glycol or ethyl alcohol, a refrigeration unit with its evaporation coil immersed in the aqueous solution, and a thermostatically controlled power source to operate the refrigeration unit to freeze the aqueous solution. Hot reservoir 12 comprises the following components, not shown: an insulated vessel containing a substance having a large latent heat of fusion at a predetermined high temperature which may be a solution of alkali hydroxides, a heating element which heats the alkali hydroxides, and a thermostatically controlled power source to operate the heating element to melt the alkali hydroxides. The power sources normally function at off-peak hours and function over extended periods to allow heating and cooling assemblies to be designed for economical power ratings. Yet the thermal reservoirs have large thermal capacity at stable temperatures and large peak thermal exchange capability. Auxiliary heat sink 13 moderates thermal exchange fluid temperature to that of selected thermal masses. Its principal function is to reduce discharge of the thermal reservoirs during appliance transitions between hot and cold. While serving such a function, unwanted thermal exchange fluid heat may be used for space heating or for preheating water heaters. Alternatively, hot thermal exchange fluid may be cooled by outside air to discharge unwanted appliance heat and reduce air conditioner loading.

An alternative system for heating and cooling thermal exchange fluid for delivery to an enclosed chamber heat exchanger of an appliance is disclosed in my U.S. Pat. No. 3,888,303 wherein an intermediate adjustable temperature reservoir exchanges heat with cold and hot reservoirs to attain a predetermined temperature for heat exchange with the thermal exchange fluid which is regulated to flow through an appliance. Such an intermediate reservoir can provide precise temperature control, but the added thermal impedance of an additional heat exchanger and thermal capacity of the intermediate reservoir reduces appliance temperature transition rates.

Thermal exchange fluid flows in a fluid circuit which includes a heat exchanger in one of the thermal reservoirs, a pump, and a supply and return main pair in which the thermal exchange fluid can flow under differential pressure. The appliances connect to the supply and return main pairs to complete the fluid circuit. A portion of a fluid circuit which provides cold thermal exchange fluid under a differential pressure comprises a return main 15A, a heat exchanger 16A in the cold reservoir, a motor operated pump 17A which develops the differential pressure, and a supply main 18A. Similarly, a portion of a fluid circuit which provides hot thermal exchange fluid under a differential pressure comprises a return main 15B, a heat exchanger 16B in the hot reservoir, a motor operated pump 17B, and a supply main 18B. Also similarly, a portion of a fluid circuit which provides thermal exchange fluid at a moderate temperature under a differential pressure comprises a return main 15C, a heat exchanger 16C in the auxiliary heat sink, a motor operated pump 17C, and a supply main 18C.

The assemblies just described which are commonly shared by a plurality of appliances provide the following advantages:

Appliance cost with its proportionate share of the common assemblies is moderate so that more complex functions can be economically provided for each appliance which include both heating and cooling capability, efficient distribution of unwanted appliance heat, charging of thermal reservoirs at off-peak hours and at moderate power levels, large peak thermal capacity, and energy conserving components designed more for efficiency than for low cost.

Use of liquid phase rather than vapor phase thermal exchange fluid allows fluid circuit components to be of smaller size and designed for lower pressure and provides conveniently adjustable appliance temperatures. Vapor phase systems operate most efficiently at vapor condensation temperatures.

A pressure cooker 20 selects connection to a supply and return main pair and regulates flow of thermal exchange fluid to attain predetermined hot or cold temperatures. Pressures above atmospheric are attained during some phases of a cooking process while pressures at or below atmospheric are used to advantage during other phases. The pressure cooker 20 comprises a pressure vessel 21 which is in a heat exchange relation with an enclosed chamber appliance heat exchanger 22 through which thermal exchange fluid flows from supply conduit 23 to return conduit 24 to exchange heat with pressure chamber 25 and with food in removable food container 26 within the pressure chamber. A valve 27 provides means to adjust pressure within the pressure vessel. A securable lid 28 attaches to seal the pressure chamber. The pressure vessel and the lid may be surrounded by thermal insulation 29. A flow selector and regulator 35 controls pressure and temperature within the pressure chamber in response to a predetermined program and to pressure or temperature information from the pressure chamber. A computer 36 provides a sequence of temperature and pressure set-points during a time period to controller 37. The controller also receives temperature and pressure inputs from sensors 38. The controller provides power to operators of selector valves 39 which function together to complete a fluid circuit across a selected supply and return main pair. The controller also supplies power to an operator of regulator valve 40 which regulates flow of the thermal exchange fluid under a differential pressure between the supply and return main pair. The pressure cooker operates by positioning selector and regulator valves according to known servo system principles. The controller and the valve operators may be electrical, pneumatic, or other known types.

Other features and advantages of pressure cooker 20 in the basic form just described are illustrated by a representative cooking application using a range of cold and hot temperatures. Food, such as a mixture for stew, is placed in the food container 26 which is placed in the pressure vessel and the lid is secured. Food processing data including cooking temperatures and serving time is entered into the computer. If the food is to be served on the following day, it is refrigerated before cooking according to the disclosure of my U.S. Pat. No. 4,156,454. The controller, in response to temperature set-points received from the computer, provides power to the selector valves 29 to allow flow of the thermal exchange fluid between the cold supply and return main pair 15A and 18A. As the thermal exchange fluid flows to absorb heat from the pressure vessel and to transfer the absorbed heat to the cold reservoir, the regulator valve 40 is opened and closed to maintain the temperature at sensor 38 at the level set by the computer which typically would be about 40° F. As time for cooking is approached, the computer transmits a higher temperature set-point to the controller which first provides power to position the selector valves 39 to allow flow of thermal exchange fluid between the auxiliary heat sink supply and return main pair 15C and 18C to moderate the temperature of the pressure vessel. The controller then provides power to position the selector valves as shown to allow flow of thermal exchange fluid between the hot supply and return main pair 15B and 18B. The controller also modulates flow of thermal exchange fluid by providing power to the regulator valve 40 to maintain the temperature at the sensor 38 at the cooking temperature set by the computer. As the food temperature rises above the atmospheric boiling temperature of water, steam is evolved and pressure within the pressure vessel rises. Pressure is then a function of temperature and both are regulated by adjusting flow of thermal exchange fluid by the controller in response to the temperature at sensor 38. The valve 27 is representative of known valving means for controlling any overpressure, venting steam and any entrained gases, and for admitting air when pressure within the pressure chamber is below atmospheric. When the computer transmits a lower temperature set-point, such as a serving temperature, the controller provides power to position the selector valves to allow flow of thermal exchange fluid between the auxiliary heat sink supply and return main pair 15C and 18C until the more moderate set-point temperature at sensor 38 is attained. Subsequent operation may include maintaining serving temperature by admitting flow of hot thermal exchange fluid and refrigerating the food by flow of cold thermal exchange if the food has not been removed from the pressure chamber in a predetermined time.

Cooking time may be controlled in response to internal food temperature as measured by a probe, not shown, but represented by sensor 38 which represents means for sensing processing environments within the pressure chamber.

In order to enhance heat transfer from the appliance heat exchanger 22 to the food container to more effectively utilize the large heat transfer capability of the system just described, a vapor condensation process is used. A small quantity of water is poured into the pressure vessel before securing the lid. As hot thermal exchange fluid flows, the water is heated to form steam which condenses on cooler portions of the pressure vessel and its contents to provide a high rate of heat transfer. The condensed water then flows back to the bottom of the pressure vessel to again form steam.

Another means for enhancing heat transfer between the appliance heat exchanger and the food container is to provide finished surfaces on the bottom of the food container and on the heat exchanger which surfaces conform to each other to improve thermal conductivity. Flat ground ceramic surfaces are preferred.

Figure 2:
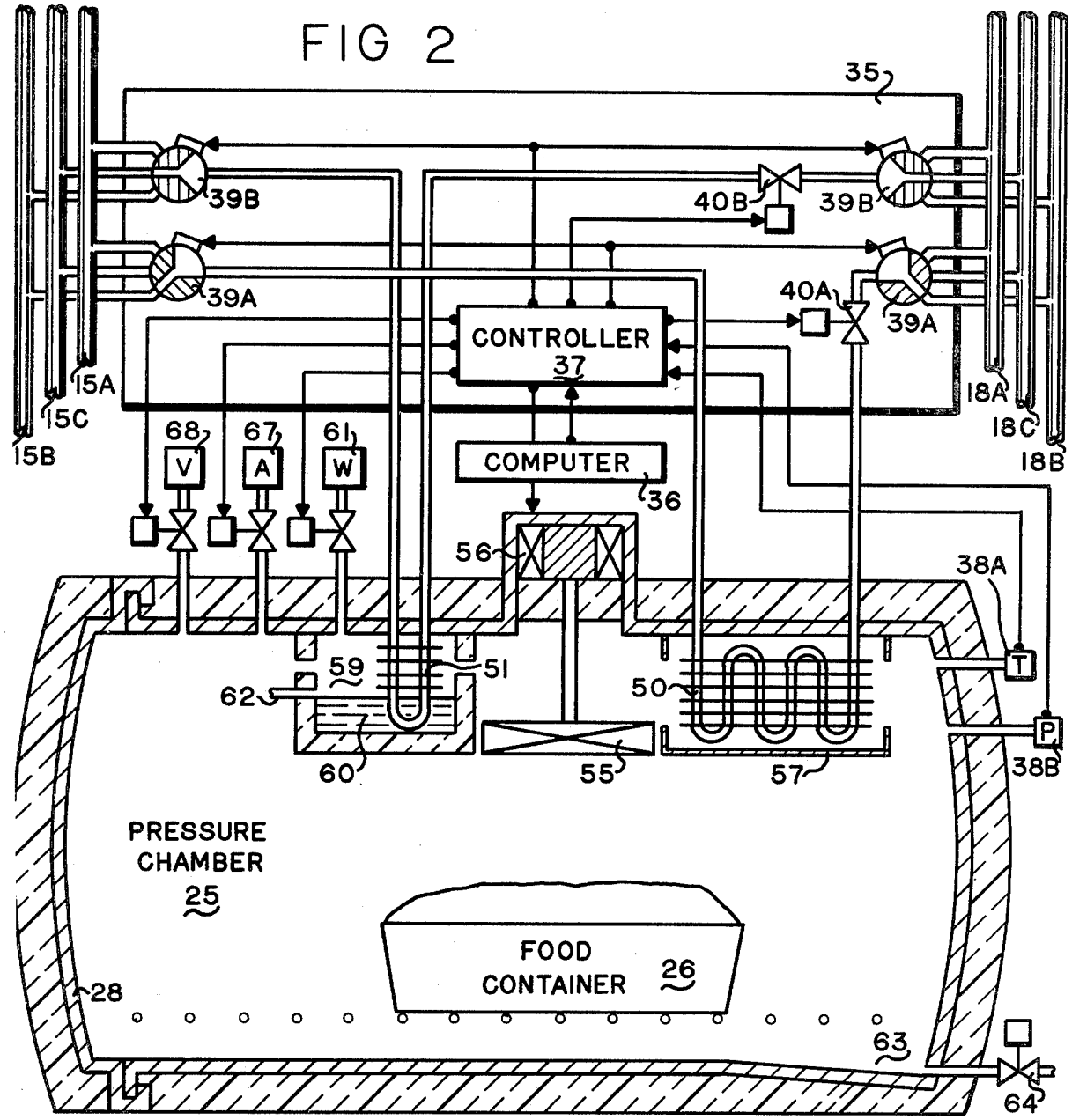
FIG. 2 is a diagrammatic drawing showing in side section a pressure cooker for enhancing heating and cooling of food by forced convection of gases and for controlling water vapor pressure in a pressure chamber, both functions being based upon controlling flow of the thermal exchange fluid by means shown schematically.

The pressure cooking apparatus shown in FIG. 2 is connected to supply and return mains which provide paths for heating and cooling liquid phase thermal exchange fluid which then is forced to flow through a single appliance heat exchanger within a pressure vessel to provide heating and cooling. The pressure cooker has an oven-like configuration wherein food is heated and cooled by convection of gases within the pressure chamber and it further uses forced convection to enhance heat exchange between the appliance heat exchanger and food. It also has a water vapor control chamber with a heat exchanger to receive thermal exchange fluid and includes among its functions condensation of water vapor to provide control over steam partial pressure so that pressure can be controlled independently of temperature at higher food processing temperatures. The pressure cooking apparatus provides selective control over high and low pressures, over high and low temperatures, and over pressure and temperature transition rates for processing advantages described in more detail with reference to FIG. 3.

Supply and return main pairs connect to hot and cold reservoirs and to an auxiliary heat sink to provide means for heating and cooling thermal exchange fluid for delivery under pressure as described with reference to FIG. 1 and are similarly labled as 15A, B, and C and 18A, B, and C. Flow selector and regulator 35 controls flow of thermal exchange fluid from the supply to the return mains for heat exchange with the pressure chamber 25 to control its temperature and pressure. Controller 37 receives temperature and pressure set-point information from computer 36, receives pressure chamber temperature information from sensor 38A, and receives pressure chamber pressure information from sensor 38B. The controller regulates pressure chamber temperature in response to the computer and sensor 38A by transmitting power to operators of selector valves 39A to select thermal exchange fluid from a supply and return main pair at the required reservoir temperature and by transmitting power to the operator of regulator valve 40A to modulate flow of the thermal exchange fluid through appliance heat exchanger 50. Similarly, the controller regulates pressure chamber pressure in response to the computer and sensor 38B by transmitting power to the operators of selector valves 39B and regulator valve 40B to select and modulate flow of thermal exchange fluid through vapor control chamber heat exchanger 51 to add or remove water vapor from the pressure chamber.

Within the pressure chamber, gases are circulated by fan 55 which is rotated by motor 56 which receives its power from controller 37. Most of the gas flow is through a duct 57 and the heat exchanger 50 which has a radiator structure to provide effective heat transfer for the flowing gases. Gases emerging from heat exchanger 50 at substantially the temperature of thermal exchange fluid flowing therein are directed toward the food container 26. The rate of heat exchange between heat exchanger 50 and the food container and exposed food surfaces is enhanced by increasing fan speed to increase gas flow velocity. A small portion of gas flow is through small openings in vapor control chamber 59 which is thermally insulated and contains water 60 in which heat exchanger 51 is partly immersed. Gases and water within the vapor control chamber approach the temperature of thermal exchange fluid within heat exchanger 51. When pressure chamber pressure is below set-point pressure, the controller causes hot thermal exchange fluid to flow and vaporize water 60 thereby increasing the partial pressure of water vapor in the pressure chamber to more closely approach the pressure of saturated steam at the temperature of the pressure chamber. As the hot thermal exchange fluid vaporizes water, the controller transmits power to an operator of a water valve connected to water source 61 to admit water into the vapor control chamber. Excess water flows from drain 62 into sump 63 from which it is forced through valve 64 which may be controlled in response to water in the sump. When pressure chamber pressure is above set-point pressure, the controller causes thermal exchange fluid from the cold reservoir or from the auxiliary heat sink to flow through heat exchanger 51 to reduce temperature within the vapor control chamber significantly below dew point temperature. Gases flowing across heat exchanger 51 are cooled to condense water vapor which flows from drain 62 to sump 63 for removal through valve 64. Gases emerging from the vapor control chamber reheat in the pressure chamber where their lower water vapor content contributes to lower pressure.

Other means for controlling pressure chamber pressure and composition of the contained gases include a compressed air source 67 connected to a valve controlled by controller 37 and a vent 68 also connected to a valve controlled by the controller. The compressed air source may be used to provide pressures above those of saturated steam at lower cooking temperatures. The vent may be used to admit air to increase pressure to atmospheric after the pressure chamber has cooled. The vent may also be used to limit pressure by releasing gases from the pressure chamber as an alternative to the vapor control chamber means but, unless the vent is connected to an outside vent, heat, moisture, and cooking odors would undesirably be released into the kitchen. Further, venting results in a water vapor atmosphere in the pressure chamber since a portion of all gases is vented while only water vapor is released by evaporation from food. In some phases of cooking processes, it is desirable to subject food such as a roast to a final short period of high temperature for surface browning and of low water vapor pressure to accelerate crisping through moisture loss. Venting combined with admission of compressed air could maintain an atmosphere of lower water vapor content. The vapor control chamber, however, provides a simple means for controlling atmosphere both for adding water vapor in an early high pressure cooking phase and for removing water vapor in a final browning and crisping phase.

Figure 3:
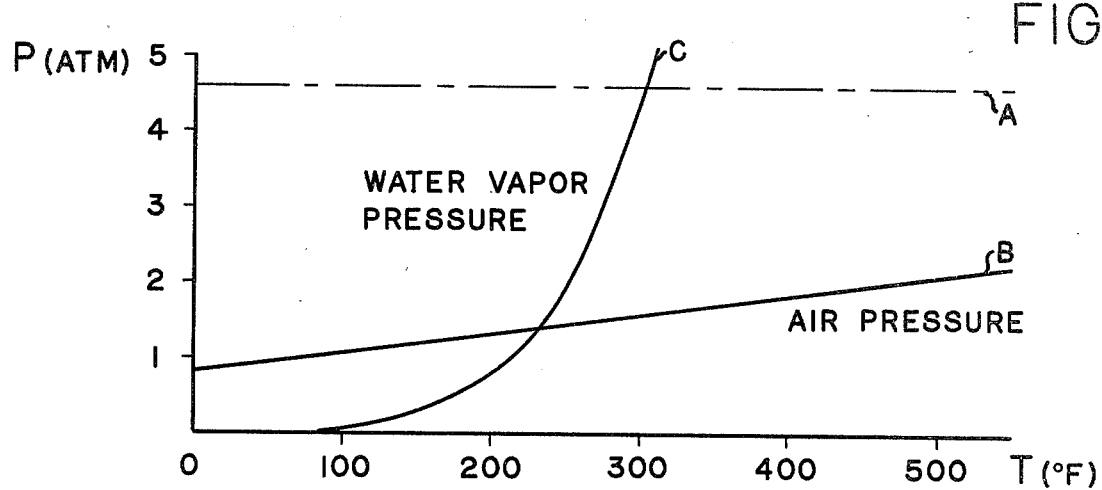
FIG. 3 is a graph showing saturated water vapor pressure as a function of temperature and temperatures which can be used in the present system of pressure cooking together with pressure of air initially in a closed pressure chamber.

FIG. 3 shows in graphic form temperature and pressure conditions under which pressure cookers can operate. Units are absolute pressure in atmospheres and temperature in degrees fahrenheit. Line A represents a limiting pressure for which a pressure vessel is designed, say 50 psig. Line B is pressure as a function of temperature of air sealed into a pressure vessel at room temperature. Curve C is pressure of saturated water vapor as a function of temperature. Most pressure cookers operate under conditions of line C. Typically, a heat source is adjusted somewhat above a desired pressure chamber temperature while a more precise adjustment is made by a pressure relief valve which vents steam as required to maintain a predetermined pressure. Air within the pressure chamber is expelled in the venting process so that contained food is processed in an atmosphere of saturated water vapor. When cooking has been completed, the heat source is removed and the pressure cooker may be cooled by natural air convection, by venting steam, or by running water over the pressure cooker. As temperature within the pressure chamber decreases, pressure decreases according to curve C, Air is then admitted so that the pressure vessel can be opened at atmospheric pressure. If the pressure chamber is not vented, air is retained and pressure is the sum of curves C and B at the temperature of the pressure chamber.

More generally, a pressure cooker can be operated at any pressure within its design limit pressure and at any temperature within its heating and cooling capability to thereby affect properties of food. One effect of operating at high pressure to the right of the water vapor pressure curve C is rapid cooking with surface browning and crisping as described with reference to FIG. 2. One effect of operating at high pressure to the left of the water vapor pressure curve using supplementary compressed air is retention of food moisture as disclosed by H. O. Hice in U.S. Pat. No. 3,672,908. An example from Hice illustrates advantages of his methods. A cut-up chicken is placed in a pressure chamber. Air is admitted to a pressure of 50 psig. Heat is applied to increase temperature to 225° F. and pressure to 60 psig in four minutes. Cooking continues for an additional 12 to 18 minutes after which the pressure vessel is cooled and cold water is sprayed on the chicken for more rapid cooling. Pressure is then decreased at a rate of 10 to 20 psig per minute. Rapid cooling of food to seal in moisture can also be attained by jets of cold nitrogen. The apparatus of Hice comprises a jacketed pressure vessel with steam as a hot thermal exchange fluid and cold water as a cold thermal exchange fluid. Nozzles for spraying cold fluid are positioned over the food. Comparing such apparatus of Hice to that of FIG. 2 illustrates several advantages of the present invention. Steam, as other vapor phase thermal exchange fluids, transfers heat effectively at its boiling temperature but is much less effective and more difficult to regulate for temperature at lower temperatures and is subject to excessive pressures at higher temperatures. Supply conduits connecting an appliance to a heat source require high pressure capability. Although steam condensate is usually returned to a heat source to conserve remaining heat values, cooling water is typically drained as expendable and is not sufficiently cold to provide such functions as extended refrigeration or rapid chilling. Internal cooling by spray of water has limited application since some foods are adversely affected by water and gaseous expendable fluids are usually too expensive for domestic use.

The present invention in the embodiment of FIG. 2 provides heating and cooling capabilities ranging from sub-freezing to hot oven temperatures with a single liquid phase thermal exchange fluid and it provides rapid heating and cooling of exposed food surfaces by forced recirculation of gases within the presure vessel through a duct containing a heat exchanger having a large surface for effective heat transfer. The present invention provides for economical and convenient domestic use the conditions for the Hice method of food processing and it further provides rapid heating at hot oven temperatures with unsaturated water vapor atmospheres for other effects on food properties.

Figure 4:
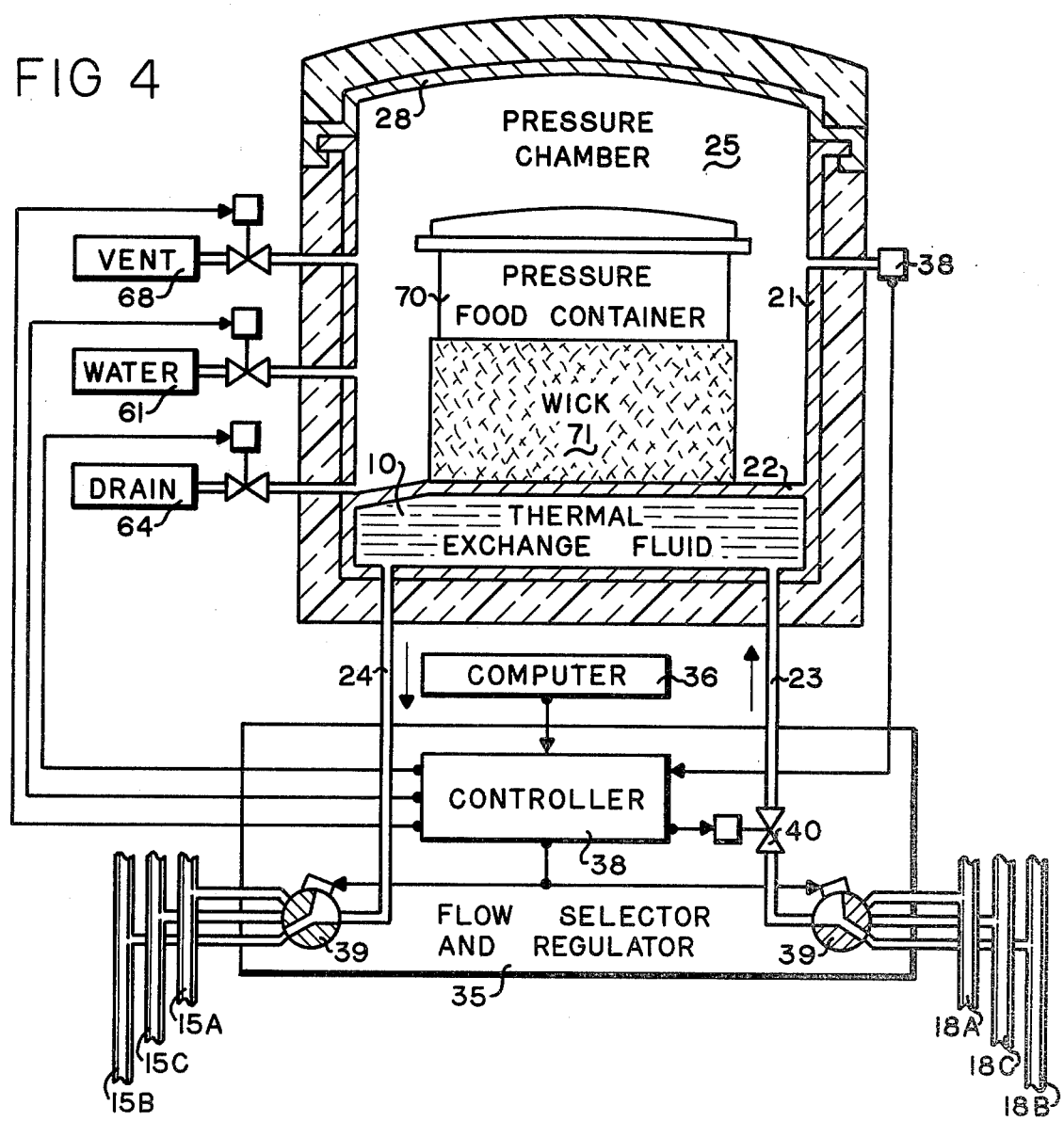
FIG. 4 is a diagrammatic drawing showing a side sectional view of a pressure cooker according to the invention with a side view of a food container covered by a wick for enhanced cooling by water vaporization.

In FIG. 4, a pressure cooking appliance which is heated and cooled by thermal exchange fluid operates to enhance heating and cooling of an enclosed food container by using latent heat of vaporization of water. During a heating phase, water boils to form steam which condenses upon and heats cooler surfaces. During a cooling phase, water is drawn into a wick and vaporizes to cool hot surfaces which the wick contacts. A low thermal impedence to and from the food container is provided to complement the low thermal impedence and large thermal capacity of the appliance system.

Food substances, such as stew ingredients, are placed within a pressure food container 70 which has a securable lid and is capable of withstanding positive and negative pressures. The pressure food container is covered by a wick 71 to a nominal level of contained food. The wick may be a removable fabric or a porous material bonded to the pressure food container and preferably has a perforated structure to allow water vapor to condense directly upon thermally conductive surfaces of the pressure food container. The pressure food container and its wick are placed in pressure chamber 25 and lid 28 is secured. Flow of thermal exchange fluid 10 through enclosed chamber appliance heat exchanger 22 is controlled by flow selector and regulator 35 as described with reference to FIG. 1. As a heating phase begins with flow of hot thermal exchange fluid, controller 37 causes a valve connected to water source 61 to open and to admit a sufficient quantity of water to cover the bottom of the pressure chamber. The controller also causes a valve connected to vent 68 to open for a sufficient time to expel air entrained in generated steam. Steam condenses upon cool surfaces which include the pressure food container to transfer heat and to flow back to the bottom of the pressure chamber to again form steam and continue the heat transfer process until temperature equilibrium is attained within the pressure vessel. During the heating phase, pressure and temperature are controlled by regulating flow of thermal exchange fluid in response to sensor 38. After a predetermined time sufficient to complete cooking of the food substance, a cooling phase begins with flow of thermal exchange fluid at a moderate temperature from the auxiliary heat sink supply main 18C. Steam within the pressure chamber condenses upon the cool bottom of the pressure chamber. Water in the wick is heated by the pressure food container, vaporizes to provide cooling, and is replaced by water drawn by capillary action from the bottom of the pressure chamber to continue the cooling process. After a predetermined cooling time, the controller causes vent 68 to open so that pressure within the pressure chamber equilibrates at atmospheric. Lid 28 is opened and the pressure food container is removed. A valving means, not shown, on the pressure food container allows internal pressure to be adjusted to atmospheric to allow opening of the pressure food container and removal of the food substance.

What I claim is:

1. Apparatus for cooking food comprising a pressure vessel having a securable lid for admission of food to a pressure chamber for cooking and for removal of the food therefrom, a heat exchanger in a heat exchange relation with the pressure chamber connecting to a supply and a return conduit to receive flow of a thermal exchange fluid, the thermal exchange fluid which remains in a liquid phase at hot and cold temperatures at substantially atmospheric pressure, said hot temperature being sufficiently above the atmospheric boiling temperature of water to heat the pressure chamber to develop substantial water vapor pressure above atmospheric in the pressure chamber, said cold temperature being sufficiently low to cool said pressure chamber to a food serving temperature, means to heat the thermal exchange fluid separate from the heat exchanger and means to cool the thermal exchange fluid separate from the heat exchanger, means to deliver the heated and cooled thermal exchange fluid under a differential pressure for flow through the heat exchanger to heat the pressure vessel to cook the food therein at pressures above atmospheric and for cooling the food to the serving temperature.

2. The apparatus of claim 1 wherein the thermal exchange fluid is further characterized as remaining in a liquid phase at temperatures sufficiently hot to cause browning of food surfaces.

3. The apparatus of claim 2 wherein the thermal exchange fluid is still further characterized as remaining in a liquid phase in the temperature range of 32° F. to 500° F.

4. The apparatus of claim 1 wherein the heat exchanger is an enclosed chamber located at the bottom of the pressure vessel.

5. The apparatus of claim wherein the food is contained in a removable food container having a bottom portion conforming to the bottom of the pressure vessel to improve conductive heat transfer between the food container and the heat exchanger.

6. The apparatus of claim 1 wherein the means for delivering heated and cooled thermal exchange fluid for flow through the heat exchanger is a fluid circuit comprising a return main connecting to said means to cool the thermal exchange fluid, a pump a develop a differential pressure in the thermal exchange fluid, and a supply main, a return main connecting to said means to heat the thermal exchange fluid, a pump, and a supply main, a selector valve connecting to the supply conduit to the heat exchanger on one side and connecting to the supply mains on the other side and another selector valve similarly connecting to the return conduit on one side and connecting to the return mains on the other side, both selector valves being positioned together to open a supply and return main pair through the heat exchanger to complete the fluid circuit.

7. The apparatus of claim 6 wherein a regulator valve is located between the selector valves to modulate flow of the thermal exchange fluid in response to power from a controller applied to an operator of the regulator valve, said controller being responsive to a set-point input and an input from a sensor in the pressure chamber.

* * * * *